US012592107B2

(12) United States Patent
Lickfelt

(10) Patent No.: US 12,592,107 B2
(45) Date of Patent: Mar. 31, 2026

(54) SPOKEN NOTIFICATIONS FOR ACOUSTIC VEHICLE ALERTING SYSTEMS

(71) Applicant: Honda Motor Co., Ltd., Tokyo (JP)

(72) Inventor: Brian Karl Lickfelt, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 18/590,108

(22) Filed: Feb. 28, 2024

(65) Prior Publication Data

US 2025/0273025 A1     Aug. 28, 2025

(51) Int. Cl.
*G07C 5/08*          (2006.01)
*B60Q 5/00*          (2006.01)
*G06F 3/16*          (2006.01)

(52) U.S. Cl.
CPC ............. *G07C 5/0833* (2013.01); *B60Q 5/00* (2013.01); *G06F 3/165* (2013.01)

(58) Field of Classification Search
CPC .......... G07C 5/0833; B60Q 5/00; G06F 3/165
See application file for complete search history.

(56) References Cited

U.S. PATENT DOCUMENTS

| | | | |
|---|---|---|---|
| 6,989,740 B2 | 1/2006 | Tabe | |
| 7,418,391 B2 | 8/2008 | Gayama et al. | |
| 8,036,875 B2 | 10/2011 | Nakashima et al. | |
| 2007/0093947 A1* | 4/2007 | Gould | G07C 5/008 701/31.5 |

| | | | | |
|---|---|---|---|---|
| 2007/0179680 A1 | 8/2007 | Tamura | | |
| 2008/0221865 A1 | 9/2008 | Wellmann | | |
| 2021/0026019 A1* | 1/2021 | Gahagan | .............. | G01S 17/931 |
| 2021/0082395 A1* | 3/2021 | Albl | ......................... | B60Q 5/00 |
| 2024/0412010 A1* | 12/2024 | Weston | ................... | G10L 15/26 |

FOREIGN PATENT DOCUMENTS

| | | | | | |
|---|---|---|---|---|---|
| CN | 2125520 | U | 12/1992 | | |
| CN | 103973765 | B * | 5/2019 | ............. | H04W 4/90 |
| CN | 110271560 | A * | 9/2019 | ....... | H04L 12/40013 |
| CN | 111762192 | A | 10/2020 | | |
| CN | 113147780 | A | 7/2021 | | |
| DE | 102018117205 | A1 | 1/2020 | | |
| JP | 2006063567 | A | 3/2006 | | |
| JP | 4895147 | B2 | 3/2012 | | |
| JP | 6356649 | B2 | 7/2018 | | |
| JP | 7026967 | B2 | 3/2022 | | |
| KR | 1999005673 | U | 2/1999 | | |
| KR | 102195881 | B1 | 12/2020 | | |
| WO | 2013168254 | A1 | 11/2013 | | |
| WO | 2017181901 | A1 | 10/2017 | | |

OTHER PUBLICATIONS

US 10,209,716 B1, 02/2019, Zych (withdrawn)

* cited by examiner

*Primary Examiner* — Rufus C Point

(74) *Attorney, Agent, or Firm* — Plumsea Law Group, LLC

(57)          ABSTRACT

A notification system for a vehicle is disclosed. The system can incorporate speech-based feedback to be presented via the acoustic vehicle alerting system (AVAS) for the vehicle. In some embodiments, the AVAS can generate sounds to improve safety of pedestrians when the vehicle is in motion, while also being equipped to produce spoken words conveying information about a vehicle-related condition. In some cases, the system can choose a specific audio file to play back in response to a user's language selection.

20 Claims, 8 Drawing Sheets

LANGUAGE SELECTION: SPANISH (US)
"THE CAR IS UNLOCKED"

LANGUAGE SELECTION: SPANISH (SPAIN)
"EL COCHE ESTÁ DESBLOQUEADO"

LANGUAGE SELECTION: SPANISH (PERU)
"EL AUTO ESTÁ DESBLOQUEADO"

| BUS COMMAND | "BEEPING" | ENGLISH (SPOKEN) | SPANISH (SPOKEN) | FRENCH (SPOKEN) |
|---|---|---|---|---|
| 0x11 | 100MS BEEP | "LOCKED" | "BLOQUEADO" | "FERMÉ À CLÉ" |
| 0x12 | 2X 100MS BEEP | "UNLOCKED" | "DESBLOQUEADO" | "DÉVERROUILLÉ" |
| 0x13 | 1 SECOND SOLID TONE | "TAILGATE IN MOTION" | "PUERTA TRASERA EN MOVIMIENTO" | "HAYON EN MOVEMENT" |

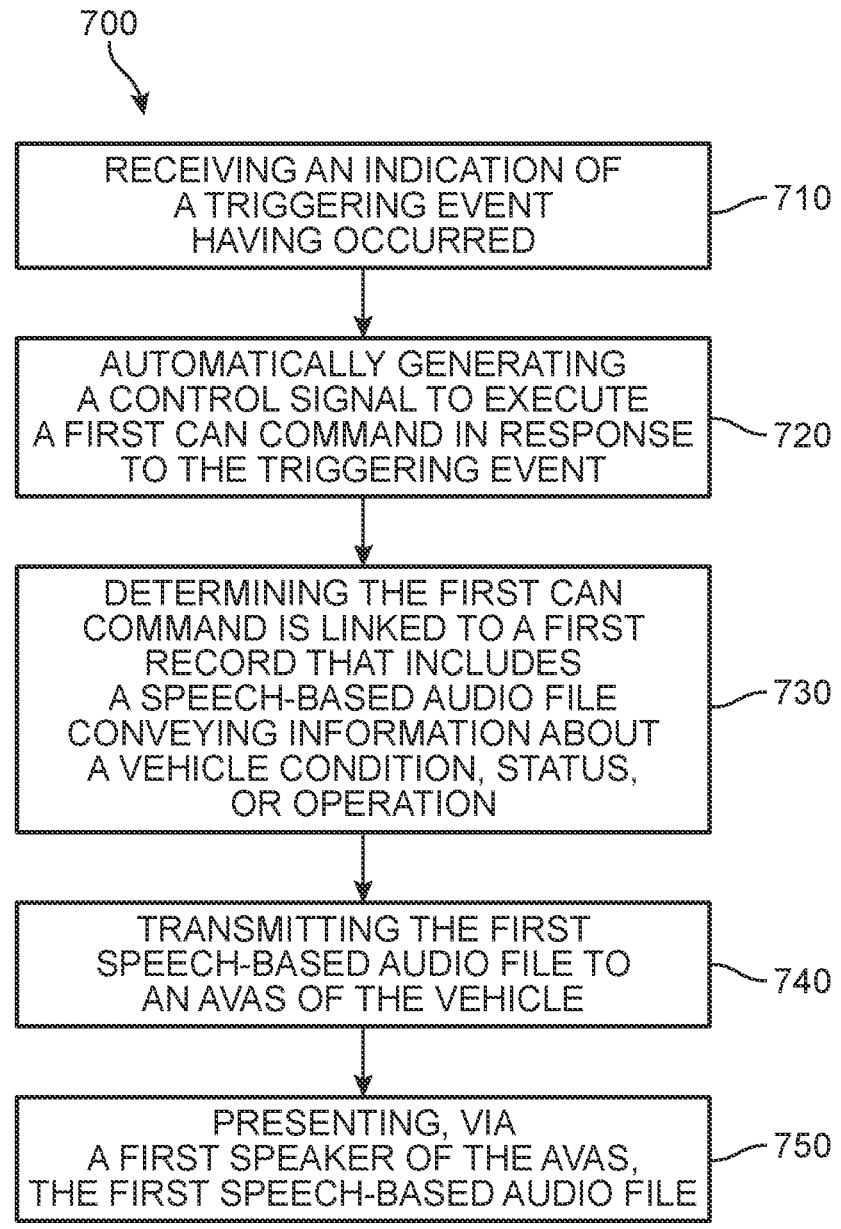

700

RECEIVING AN INDICATION OF
A TRIGGERING EVENT
HAVING OCCURRED — 710

AUTOMATICALLY GENERATING
A CONTROL SIGNAL TO EXECUTE
A FIRST CAN COMMAND IN RESPONSE
TO THE TRIGGERING EVENT — 720

DETERMINING THE FIRST CAN
COMMAND IS LINKED TO A FIRST
RECORD THAT INCLUDES
A SPEECH-BASED AUDIO FILE
CONVEYING INFORMATION ABOUT
A VEHICLE CONDITION, STATUS,
OR OPERATION — 730

TRANSMITTING THE FIRST
SPEECH-BASED AUDIO FILE TO
AN AVAS OF THE VEHICLE — 740

PRESENTING, VIA
A FIRST SPEAKER OF THE AVAS,
THE FIRST SPEECH-BASED AUDIO FILE — 750

FIG. 7

SPOKEN NOTIFICATIONS FOR ACOUSTIC VEHICLE ALERTING SYSTEMS

BACKGROUND

The present disclosure generally relates to vehicular audio notifications, and more particularly, to a customizable language-based alert system for presenting information from an exterior of a vehicle.

Currently, many vehicles are designed to provide feedback regarding various operations or conditions of the vehicle to improve driver awareness, including for example, beeps when a door is open. However, vehicle users have indicated confusion regarding the various feedback sounds that are emitted by their vehicles.

There is a need in the art to provide clarity to drivers in order to improve vehicle safety and user experience.

SUMMARY

The disclosed embodiments provide methods and systems for a notification system employing acoustic vehicle alerting systems in vehicles.

In one aspect, a method of managing vehicle notifications is disclosed. The method includes a first step of receiving, at an electronic control unit (ECU), an indication of a first triggering event having occurred. In addition, the method includes a second step of automatically generating, at the ECU, a first control signal in response to the first triggering event. A third step includes automatically determining, by a spoken language feedback system, the first control signal is linked to a first record, the first record including a first speech-based audio file conveying first information about a vehicle-related condition, status, or operation that is associated with the first triggering event. A fourth step includes automatically presenting, via a first speaker of an acoustic vehicle alerting system (AVAS), the first speech-based audio file.

In another aspect, the disclosure provides a spoken language feedback system. The system includes an acoustic vehicle alerting system (AVAS) communicatively coupled to at least one vehicle electronic control unit (ECU). The AVAS is configured to: (1) access a language selection stored in a spoken word feedback repository of the spoken language feedback system, the spoken word feedback repository being communicatively coupled to the AVAS; (2) generate a first control signal corresponding to a first triggering event; (3) access a first record that is linked to a first record, the first record including a first speech-based audio file conveying first information about a vehicle-related condition, status, or operation that is associated with the first triggering event; and (4) present, via a first speaker of the AVAS, the first speech-based audio file In another aspect, the disclosure provides a system for managing vehicle notifications. The system comprises one or more computers and one or more storage devices storing instructions that are operable, when executed by the one or more computers, to cause the one or more computers to: (1) receive, at an electronic control unit (ECU), an indication of a first triggering event having occurred; (2) automatically generate, at the ECU, a first control signal in response to the first triggering event; (3) automatically determine, by a spoken language feedback system, the first control signal is linked to a first record, the first record including a first speech-based audio file conveying first information about a vehicle-related condition, status, or operation that is associated with the first triggering event; and (4) present, via a first speaker of an acoustic vehicle alerting system (AVAS), the first speech-based audio file.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 7 is a flow diagram of a process of managing vehicle notifications, according to an embodiment.

DETAILED DESCRIPTION

Figure 1:
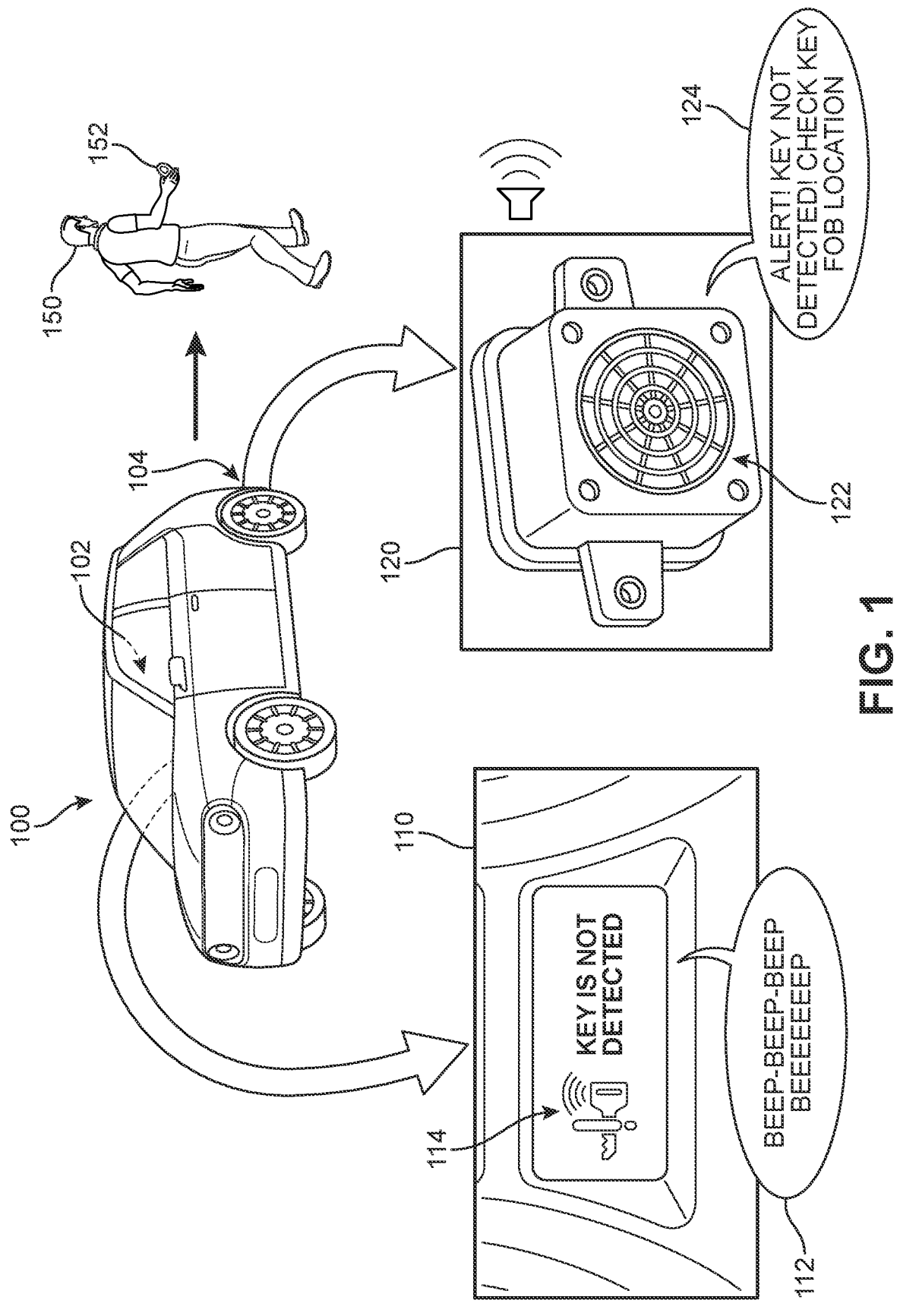
FIG. 1 presents a first scenario of a vehicle in which a vehicle notification system is installed, according to an embodiment.

Quiet Road Transport Vehicles (QRTV) are projected to be the dominant vehicle type in the future. As a general matter, QRTVs are a class of power-driven vehicles differentiated from others by the sound emitted from the propulsion mechanism. At low speeds in particular, QRTVs are described as emitting less overall sound than other vehicles. Consequently, these QRTVs are less able to be aurally detected by non-motorists in the same sound environment. Whilst offering environmental benefits with respect to reduced emissions and noise pollution, the emergence of QRTV's into the market have been associated with concerns with respect to pedestrian safety due to the low level of noise emitted at low travel speeds. In order to address such concerns, audio components have been installed for presentation to persons outside the vehicle, for example to alert pedestrians who may not otherwise be aware of the oncoming vehicle.

For example, acoustic vehicle alert systems (AVASs) have been incorporated into many QRTVs, and are increasingly expected to be available in most if not all QRTVs in the near future. An AVAS can be generally described as a set of components installed in vehicles for the purpose of emitted a sound external to the vehicle. The sound emitted must be able to be detected by pedestrians at low speeds, particularly at speeds at or below the speed at the contribution of tire and wind noise is minimal. The general specifications of an AVAS include the speed range and direction, the acoustics, and operation. An AVAS is typically incorporated into a QRTV because external sound synthesis is desirable for safety of others. For purposes of this application, the term "synthetic external sound" refers to an external sound of a vehicle which is artificially produced by outputting a specifically generated audio signal using at least one electroacoustic transducer, e.g., a loudspeaker (or simply 'speaker').

As will be described in greater detail below, the proposed systems and methods are directed to generating language-based vehicle feedback for presentation outside of a vehicle using externally positioned speakers, such as those provided by the AVAS. More specifically, the proposed embodiments can augment traditional acoustic vehicle alerting systems by the storage and retrieval of audible (spoken word) comments. In some embodiments, these comments would be available for presentation in multiple languages. Thus, in different embodiments, the system extends far beyond simple traditional beep alerts (e.g., one 100 ms beep indicating that the doors just locked) by reference to recordings of various audible feedback ("locked", "unlocked", "parking obstruction", "keyless remote not detected", etc.) in multiple languages.

In at least one example, the AVAS is configured to detect or request, via the vehicle's communication bus for processing or receiving control signals, the user's selection of language and choose what files to play back when the command for feedback comes. In such cases, there would not be a need to make disruptive or complex changes from traditional systems. For example, if the vehicle requests the unlocked state buzzer command (e.g., two beeps), the proposed system would translate the same command for two beeps to cause playback of the spoken notification "unlock". This operation could be extended across some or all of the buzzer commands, which are each linked to a specific command on the communication bus. In some embodiments, the conventional beeping sounds can be maintained, while the spoken words are presented via the AVAS, in addition to the non-spoken audio. Furthermore, as noted above, the playback of spoken-word notifications can be modified based on the language selection made by the vehicle's owner or user.

It can be appreciated that conventional vehicle feedback, employing non-spoken audio such as beeping, can be a source of confusion to occupants, and often necessitate some further investigation to determine the cause (vehicle operational state or condition) of the beeping before it can be addressed. In cases where the person is still in the interior compartment of the vehicle, there may be some description of the situation which has triggered the beeping by a message shown on an electronic display. However, such supplemental information cannot be viewed or otherwise made apparent to those who are outside of the vehicle. Such scenarios can lead to frustrating customer experiences. With voice (spoken) feedback, such frustrations are removed and customers can immediately act on the notification if so desired.

For purposes of introduction, an overview of one embodiment of the proposed systems and methods is illustrated with reference to FIG. 1. In FIG. 1, a view of a first vehicle 100 in which an AVAS 104 has been installed is depicted. In one embodiment, the AVAS 104 can include a plurality of components (not shown in FIG. 1) such as one or more external speakers disposed in various locations around the vehicle.

As a general matter, the exterior of the vehicle 110 can be understood to include those portions of the vehicle outside of the passenger interior cabin. For reference, the vehicle includes a forward end (toward the front bumper), a rear end (toward the rear bumper), a first side (toward the driver side), and a second side (toward the passenger side). Speakers of the AVAS 104 are typically placed to allow for production of sound that meets regulations while maintaining a pleasant in-cabin 102 experience for the passengers of the vehicle. The physical location and orientation of each speaker can be optimized to allow the acoustic energy from the speaker to flow with as few obstructions as possible, generating sound to the external area around the vehicle. In the illustrated example, the speakers are positioned behind a rear tire toward the back of the first vehicle 100. In different embodiments, speakers may be positioned in any suitable location around the vehicle.

In different embodiments, the AVAS 104 can include a processor/controller and memory. The processor/controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory. Furthermore, memory can include computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor during execution of the instructions.

In the example scenario of FIG. 1, a first user 150 of vehicle 100 is moving away from the first vehicle 100 while the vehicle is still operational (turned on). However, the first user 150, who may or may not be the driver, has also taken with them a keyless FOB 152 used to access and engage the first vehicle 100. Conventionally in such a scenario, the first vehicle 100 can detect such an event and in response emit an alert 110 that may include one or both of an audible nonspeech sound 112 (e.g., beep-beep-beep beeeeep) and/or a visual indicator 114 (e.g., a message displayed on a screen in the vehicle, such as "Key is not detected") that may be received by occupants within the first vehicle 100.

However, once the first user 150 has departed from the first vehicle 100, particularly once the doors are shut, they may not realize that the audible nonspeech sound 112 is an alert meant to remind them that they have removed the key fob 152 from the vehicle while the vehicle is on. It can be appreciated that this may be highly problematic, as the first vehicle 100 has been left 'running', without the key FOB 152, for an indeterminate amount of time. The proposed embodiments obviate the limitations of the alert 110 by causing an externally-presented language-based notification 120 to be produced via one or more speakers 122 of the AVAS 104. In this case, the notification 120 includes speech auditory feedback 124 (e.g., "Alert! Key not detected! Check key FOB location"). With this type of feedback, the first user 150 who is outside the first vehicle 100 is able to receive the information in a format that is more easily understood. The easier to understand notification 120 can be used to make better decisions with regard to the operation of the vehicle as well as improve the overall interactions and feelings the first user 150 has toward the first vehicle 100.

Figure 2:
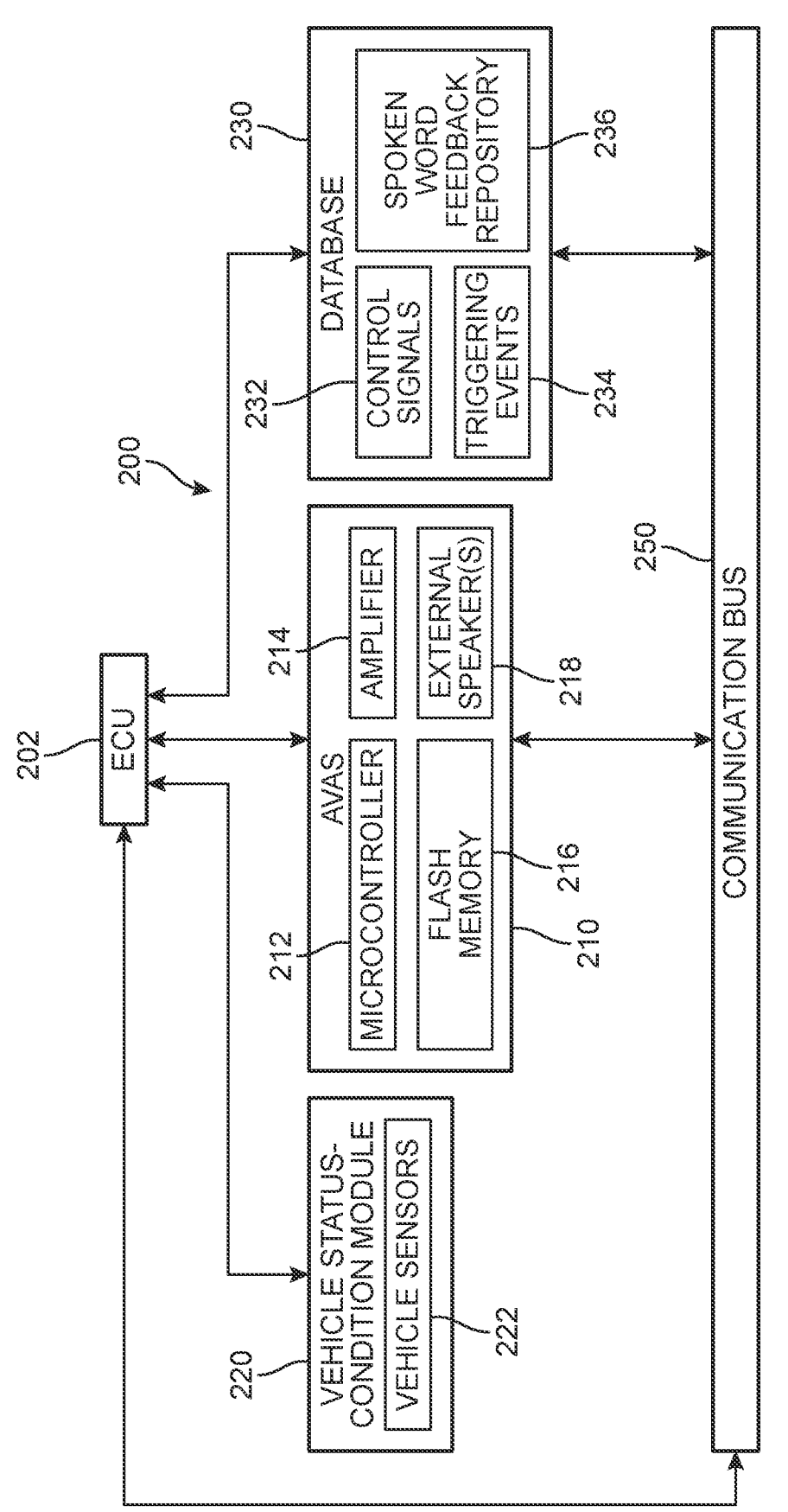
FIG. 2 is an environment in which one embodiment of the proposed systems may be implemented.

FIG. 2 is a block diagram of an exemplary spoken language feedback system 200. In the exemplary embodiment, the spoken language feedback system 210 includes an AVAS 210 and a database 230. The AVAS 210 is communicatively coupled to an electronic control unit (ECU) 202 and/or a communication bus 250.

In different embodiments, vehicles described herein can be understood to include a vehicle control system. The vehicle control system is realized by, for example, one or more processors or hardware having equivalent functions. The vehicle control system may have a configuration in which a processor such as a central processing unit (CPU), a data storage device, an electronic control unit (ECU) 202 as part of the vehicle control system in which a communication interface is connected by an internal bus, a microprocessing unit (MPU), and the like are combined.

In some embodiments, the spoken language feedback system 200 is communicatively coupled to, for example, the ECU 202 and or other vehicle components that allow spoken language feedback system 200 to function as described herein, via a vehicle communication bus 250. In at least one embodiment, vehicle communication bus 250 comprises a Controller Area Network (CAN), also referred to as a CAN bus, which can comprise a data serial bus. In some examples, the vehicle communication bus 250 includes one or more data buses. In different embodiments, the vehicle communication bus 250 can include a CAN bus, LIN bus, FlexRay bus, MOST bus, or any other type of communication bus that allows the vehicle to function as described herein.

The vehicle communication bus 250 allows vehicle components to communicate and control communication operations. In the vehicle communication bus 250, each component is capable of transmitting and receiving messages. For example, a system includes components A, B, and C on a vehicle communication bus. In this example, component A transmits through the vehicle communication bus a message addressed to component C. Both components B and C receive the message. Component B discards or ignores the message and component C receives and potentially acts on the message. The ECU 202 is in communication with and through the vehicle communication bus 250.

TAs noted above, the spoken language feedback system 200 includes AVAS 210 installed onboard the vehicle. An AVAS can include components such as a microcontroller 212, amplifier 214, flash memory 216, and/or external speaker(s) 218, among others. As shown in FIG. 2, the AVAS 210 can also include or be otherwise in communication with a storage database 230. As used herein, the term "database" may refer to either a body of data, a relational database management system (RDBMS), or to both. A database may include any collection of data including hierarchical databases, relational databases, flat file databases, object-relational databases, object-oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein.

In different embodiments, the database 230 includes records that determine (a) what conditions or operations should cause the presentation of some feedback to a user (triggering events 234), (b) which bus command such events are associated with (control signals 232), and (c) the corresponding spoken words that should be emitted by speaker(s) of the AVAS 210 (spoken word feedback repository 236), which can include multiple sub-records or sound/audio source files for each language, to be automatically selected based on the previously designated user's language preference/setting.

Thus, the proposed embodiments allow for the presentation of a variety of spoken word notifications via the AVAS. Simply for purposes of illustration, FIGS. 3, 4A, 4B, and 5 depict some example scenarios in which the system may be implemented. As noted above, the spoken language feedback system 200 is able to present spoken notifications in a plurality of different languages. In an exemplary embodiment, the AVAS 210 is configured to access a language selection stored within a vehicle memory. In one example, the AVAS 210 can automatically detect the stored language selection without any further user input or interaction.

For example, another system within the vehicle, for example an infotainment system that includes a human machine interface (HMI) and a display may allow a user to select, via the HMI, a language to be used to present information/options to the user via the infotainment system display. The AVAS 210 is configured to access the language selection stored within the infotainment system. In different embodiments, the AVAS 210 may be configured to access the language selection at regular intervals or frequencies and/or following specific conditions and events. For example, the AVAS 210 may be configured to access the language selection each time the vehicle is started, each time the AVAS is restarted, factory reset, and/or at some predesignated frequency, such as every day, every week, month, 10 days, or other regular period. Such automated 'check-ins' can ensure the AVAS 210 accesses the most current language selection at the time of the playback (i.e., in case the language selection has been changed). Once the AVAS 210 performs this verification and accesses the language selection, the AVAS 210 can then store the language selection in the AVAS memory. Thus, by automatically accessing the language selection that has been provided by the user to the vehicle for a different purpose, the spoken language feedback system 200 is able to provide audio output in the user's desired language without requiring that the user perform a separate language selection operation.

Figure 3:
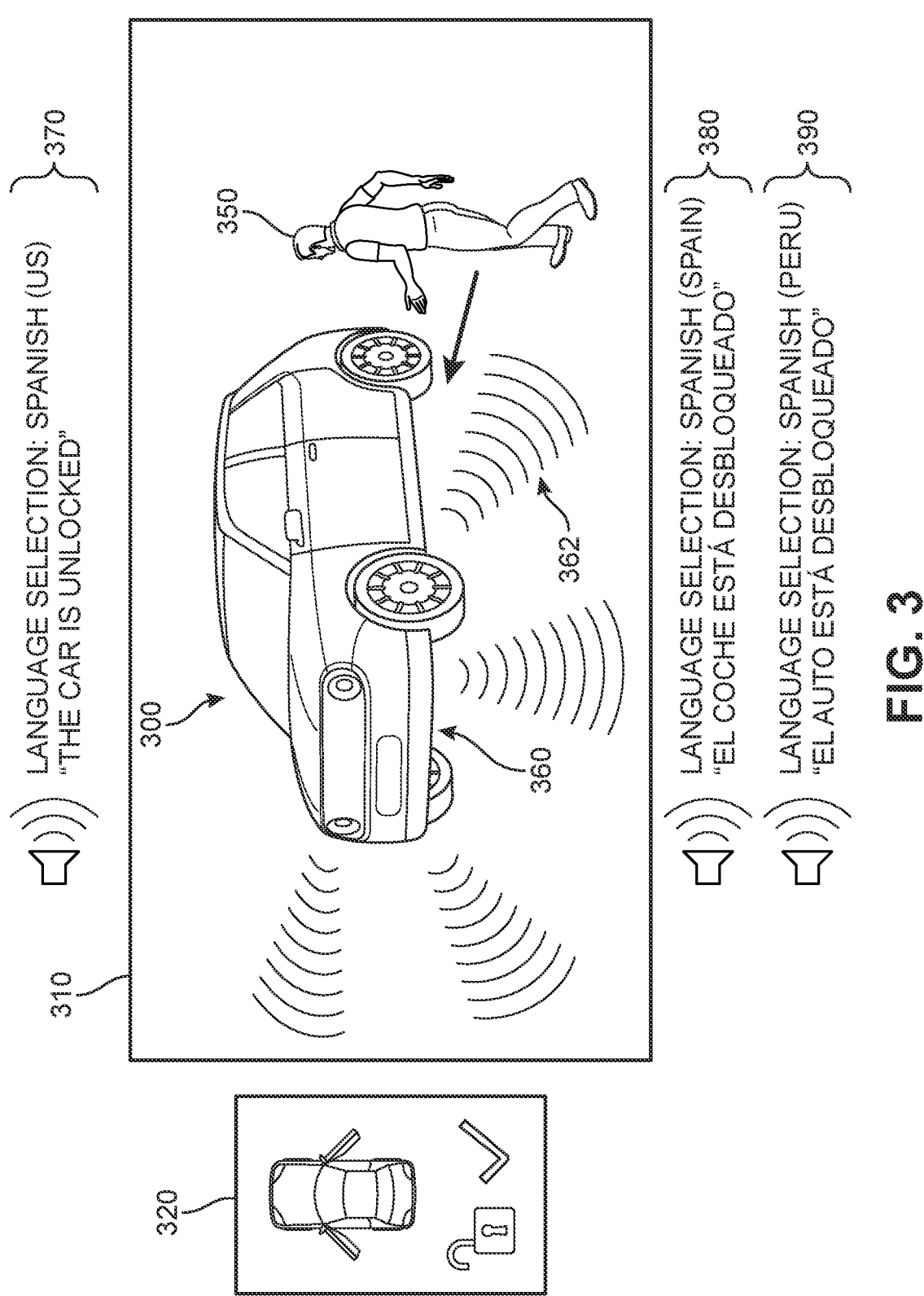
FIGS. 3 and 4 depict examples in which different audio files are selected for playback depending on the language selected by a user, according to an embodiment.

In the example of FIG. 3, a second user 350 is shown approaching a second vehicle 300. The second user 350 uses their remote key FOB to unlock the doors. One or more AVAS speaker(s) 360 for the vehicle emits a first audio notification 362 that is responsive to his action (unlocking the vehicle). While the content type (i.e., the information to be conveyed based on the triggering event) of the first audio notification 362 can be pre-set to align with the triggering operation (e.g., unlocking), it can be understood that in different embodiments, the actual expression of this content for first audio notification 362 can be selected based on a previous acceptance by the user of a default language, or an active selection that changes the default to his desired language. Thus, in a first scenario 370, the default language could be English (US), and so the first audio notification 362 could include an expression of the pertinent feedback as "The car is unlocked". In cases where the second user 350 made a different language selection (or the default was not English), the output could differ, while the content of the feedback remains the same or substantially similar. This is reflected by a second scenario 380 in which the selected language was Spanish (Spain), and the first audio notification 362 could instead include an expression of the pertinent feedback as "El coche esta desbloqueado". In a third scenario 390, the selected language could alternatively be Spanish (Peru), and the first audio notification 362 could thereby include an expression of the pertinent feedback as "El auto esta desbloqueado" to reflect the difference for Spanish that is spoken between the two regions (e.g., it is more common to use the term auto for car in Peru, and coche for car in Spain). In other words, the triggering operation can cause the system to select (a) the appropriate type of content, as well as (b) the expression of this content in the desired language. For each type of feedback stored in the database, there may be multiple translations (expressions) corresponding to each language available.

In different embodiments, the proposed systems can incorporate multiple sub-records for each control signal, where each sub-record offers the same or similar content in a different language. In some embodiments, the language options can include Brazilian Portuguese, Canadian French, English (US), French Creole, Haitian Creole, Navajo, Quechua, Spanish (Argentina), Catalan, Danish, Dutch, Faroese, Finnish, Flemish, French, German, Greek, Icelandic, Italian, Norwegian, Portuguese, Spanish (Spain), Swedish, UK English/British English, Belarusian, Bosnian, Bulgarian, Croatian, Czech, Estonian, Hungarian, Latvian, Lithuanian, Macedonian, Polish, Romanian, Russian, Serbian, Slovak, Slovenian, Turkish, Ukrainian, Amharic (Ethiopia), Dinka (Sudan), Ibo (Nigeria), Kirundi, Mandinka, Nuer (Nilo-Saharan), Oromo (Ethiopia), Kinyarwanda, Shona (Zimbabwe), Somali, Swahili, Tigrigna (Ethiopia), Wolof, Xhosa, Yoruba, Zulu, Arabic, Dari, Farsi, Hebrew, Kurdish, Pashtu, Punjabi, Urdu (Pakistan), Armenian, Azerbaijani, Georgian, Kazakh, Mongolian, Turkmen, Uzbek, Bengali, Cham, Chamorro (Guam), Gujarati (India), Hindi, Indonesian, Khmer (Cambodia), Kmhmu (Laos), Korean, Laotian, Malayalam, Malay, Marathi (India), Marshallese, Nepali, Sherpa, Tamil, Thai, Tibetan, Trukese (Micronesia), Vietnamese, Amoy, Burmese, Cantonese, Chinese, Chiu Chow, Chow Jo, Fukienese, Hakka (China), Hmong, Hainanese, Japanese, Mandarin, Mien, Shanghainese, Taiwanese, Taishanese, Fijian, Palauan, Samoan, Tongan, Bikol, Cebuano, Ilocano, Ilongo, Pampangan, Pangasinan, Tagalog, Visayan, among others.

Figure 4:
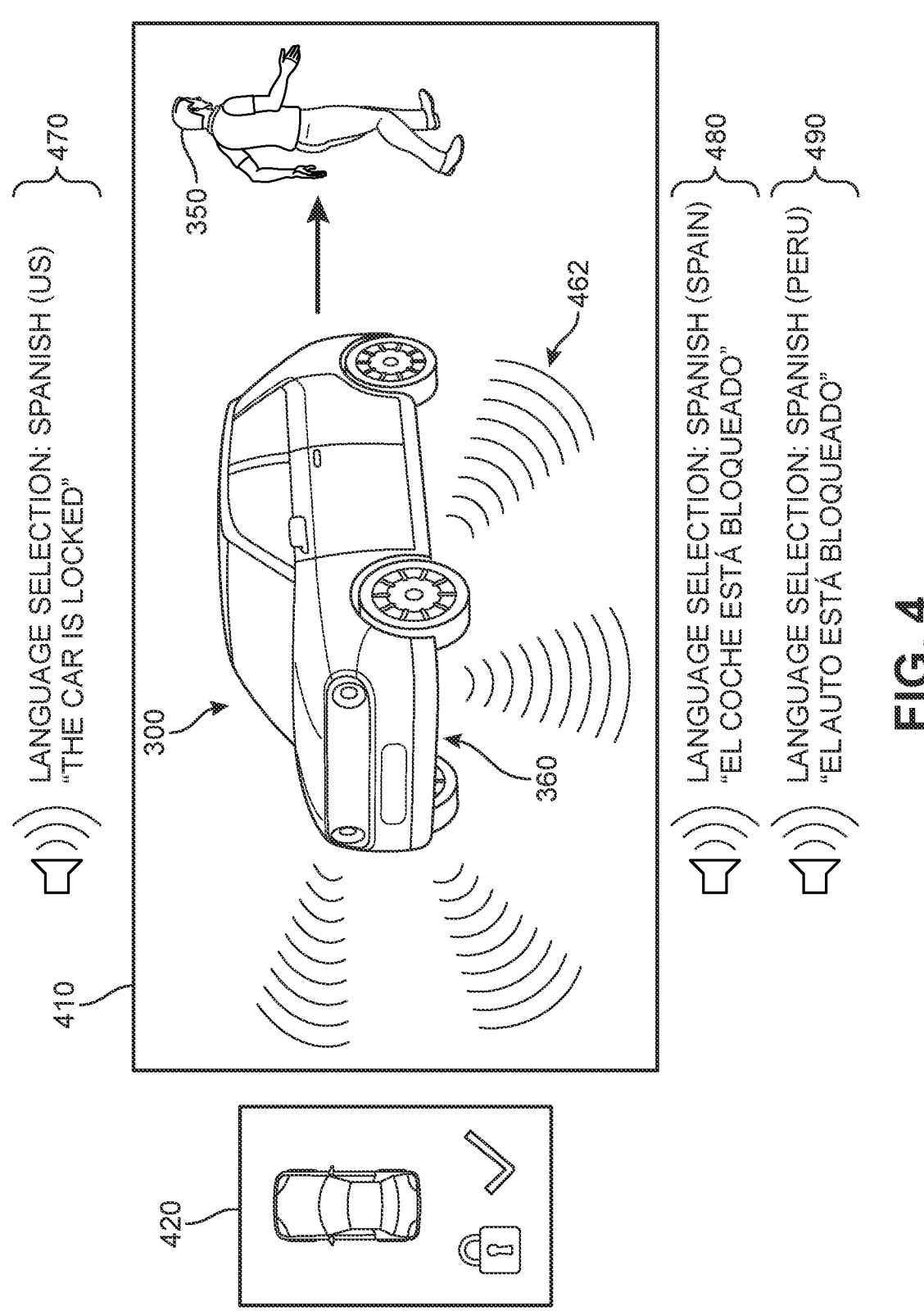

In FIG. 4, the second user 350 is walking away from the vehicle and uses the remote key FOB to lock the doors. The AVAS speaker 360 emits a second audio notification 462 that is responsive to his action (locking the vehicle). While the content type (i.e., the information to be conveyed based on the triggering event) of the second audio notification 462 is pre-set to align with the triggering operation (e.g., locking), it can be understood that in different embodiments, the actual expression of this content for second audio notification 462 can again be selected based on a previous acceptance by the user of a default language, or an active selection that changes the default to his desired language. In a first scenario 470, the default language could be English (US), and so the second audio notification 462 could include an expression of the pertinent feedback as "The car is locked". In cases where the second user 350 made a different selection, the output could differ, while the content remains the same or substantially similar. This is reflected by a second scenario 480 in which the selected language was Spanish (Spain), and the second audio notification 462 could include an expression of the pertinent feedback as "El coche esta bloqueado". In a third scenario 490, the selected language could instead be Spanish (Peru), and the second audio notification 462 could thereby include an expression of the pertinent feedback as "El auto esta bloqueado" to reflect the difference for Spanish that is spoken between the two regions.

Figure 5A:
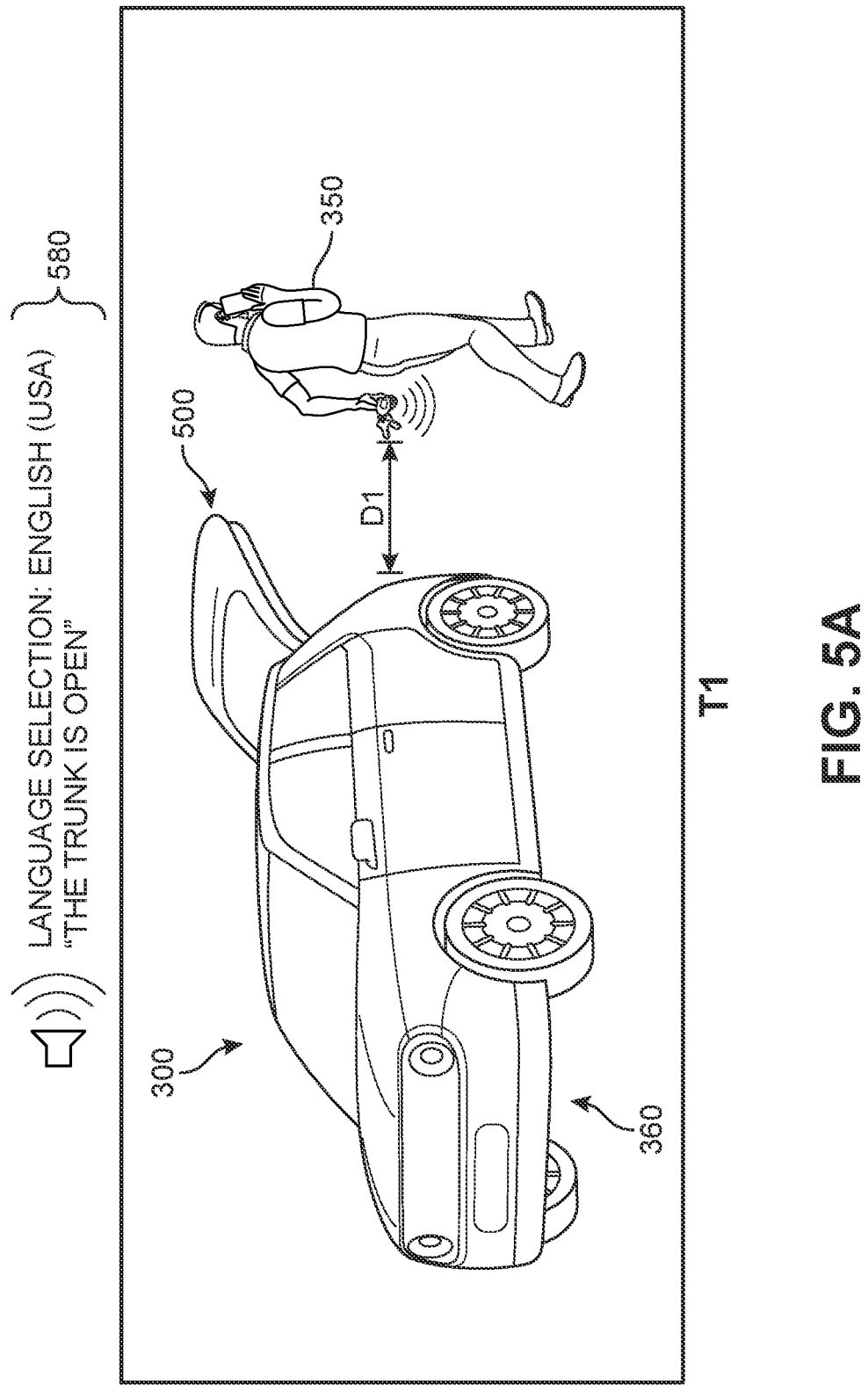
FIGS. 5A and 5B depict a scenario in which the speech-based feedback changes in response to ongoing changes in a status of the vehicle, according to an embodiment.
Figure 5B:
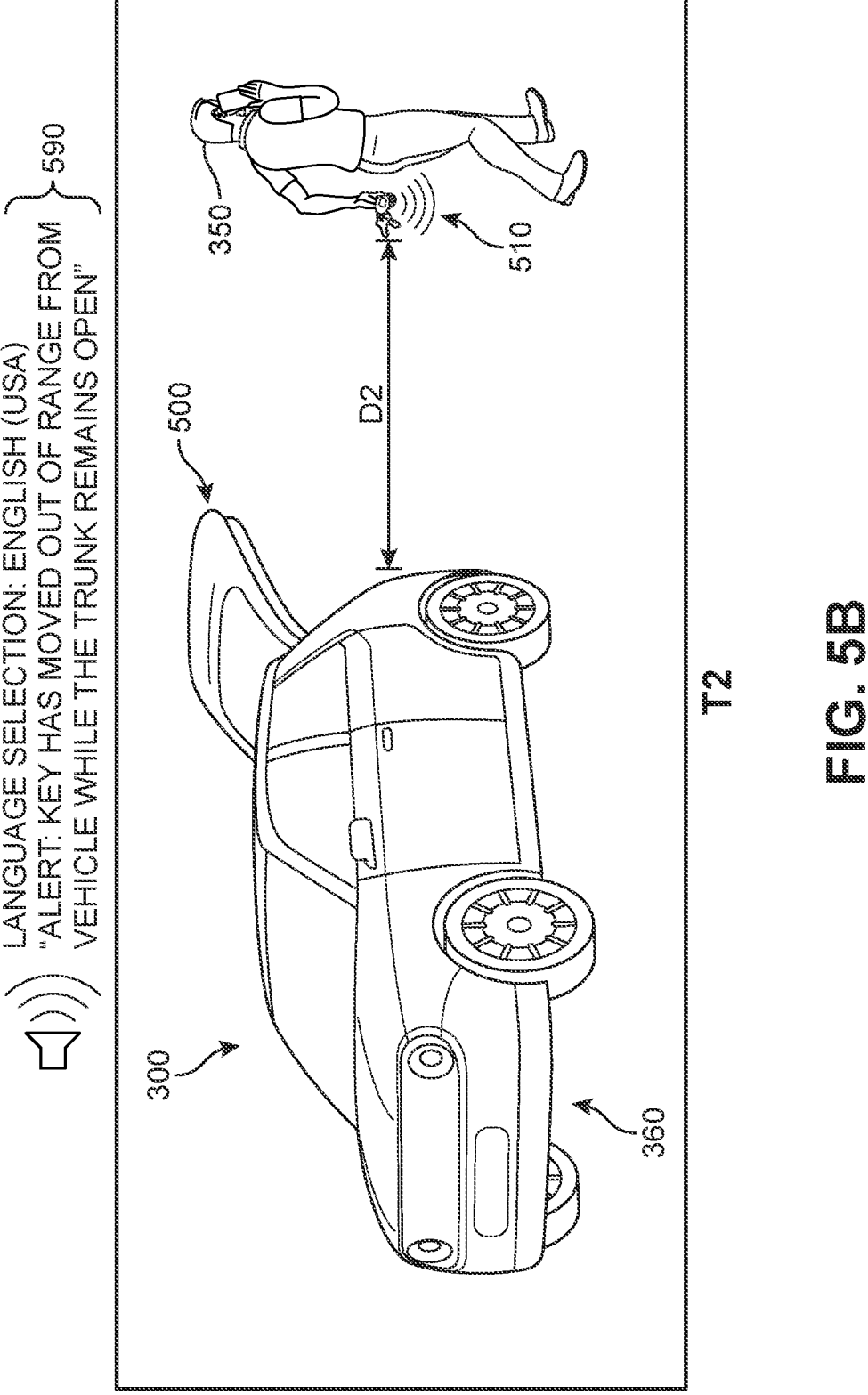

Referring next to FIGS. 5A and 5B, another example of an implementation of the proposed systems is depicted. In FIG. 5A, the second user 350 is again shown outside the second vehicle 300, with trunk hatch 500 having just been opened. In response to this triggering operation, the AVAS speaker(s) 360 the system emits a third audio notification 580 in the user's chosen language to indicate the status of the vehicle ("The trunk is open"). In some embodiments, the second vehicle 300 can further generate spoken feedback in response to more passive actions by the second user 350. For example, as the second user 350 at a first time T1 moves from a first distance D1 from the vehicle in FIG. 5A to a second distance D2 at a second time T2 in FIG. 5B, a signal from key FOB 510 can reflect this increased distance and cause a fourth audio notification 590 to be emitted from the AVAS speaker(s) 360 that is related to the content of the previous feedback but more urgent, such as "Alert: Key has moved out of range of vehicle while the trunk remains open". In other words, different types of detected events can alter the expression of the feedback to correspond to the greater urgency of the information to be conveyed to the user. The second user 350—in this case distracted while talking on the phone—may not have noted the open trunk as he walked away (e.g., into a store)—were there only beeps emitted or the display in the interior passenger cabin were used to present a notification. However, it can be appreciated that a spoken word-based alert is more likely to be noticed by the user, even while on the phone, and also ensures the user promptly understands what the alert is regarding. In this case, the user can immediately turn and acknowledge and correct the issue while maintaining the phone call, because they do not need to 'figure out' why the vehicle is beeping.

Figure 6:
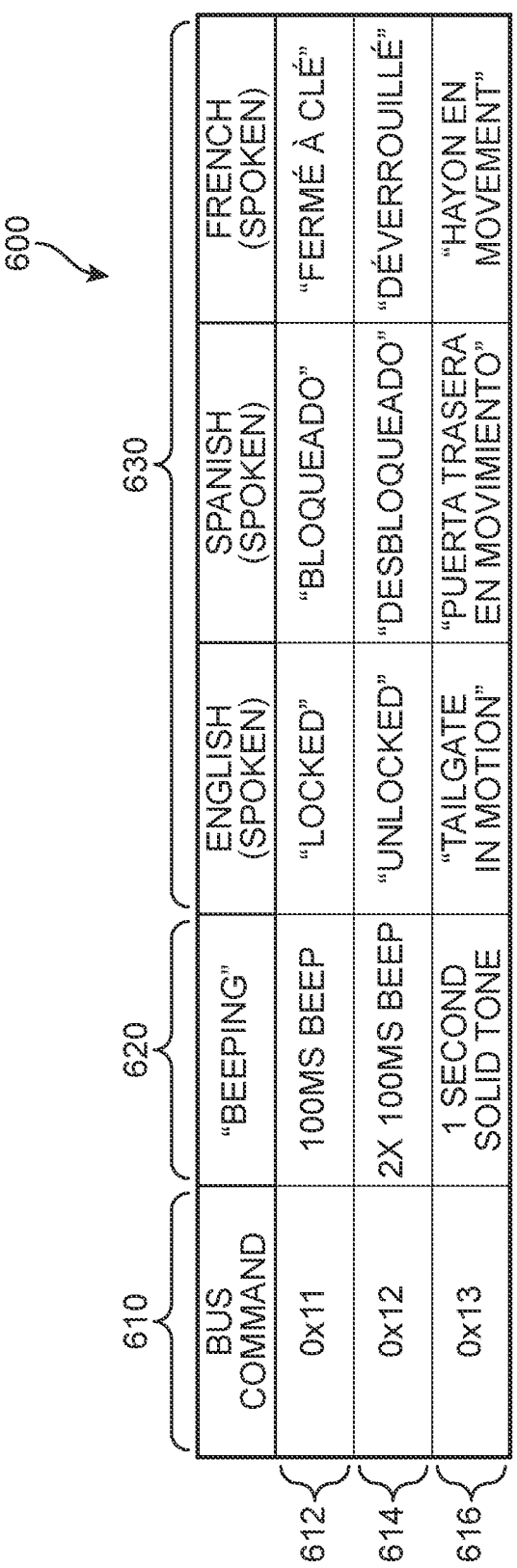
FIG. 6 is a table showing non-limiting examples of control signals and their associated speech-based audio messages, according to an embodiment.

As described with reference to FIG. 2, the technical problems described herein can be solved by a system that stores spoken-word feedback that is linked to a control signal. For purposes of illustration, some non-limiting examples of these stored relationships are shown in FIG. 6. For example, each control signal (e.g., control signal column 610) such as a first control signal 612 shown as "0x11" can have a predesignated association with a specific type/frequency/length/pattern of beeps (e.g., 100 ms beep, in beeping column 620). In different embodiments, the same control signal can also be associated with one or more expressions of spoken word feedback 630. Thus, the first control signal 612 is linked to the locking operation, and is available for presentation in multiple languages 630 (shown here as English, Spanish, French, though this list is simply shown as a sample) that will be emitted by the AVAS speaker(s) when the appropriate triggering operation (car being locked) defined by the control signal occurs, in the user-selected language. Similarly, second control signal 614 shown as "0x12" is linked to the unlocking operation, and is available for presentation in multiple languages 630 that will be emitted by the AVAS speaker(s) when the appropriate triggering operation (car being unlocked) defined by the control signal occurs, in the user-selected language. In addition, third control signal 616 shown as "0x13" is linked to a change in the position of tailgate, and is available for presentation in multiple languages 630 that will be emitted by the AVAS speaker(s) when the appropriate triggering operation (car tailgate being opened/closed) defined by the control signal occurs, in the user-selected language.

In different embodiments, a wide range of other spoken language feedback can also be stored for presentation by the vehicle when appropriate in association with each control signal. In some embodiments, each feedback content can be further stored with translation in different languages, including but not limited to feedback such as "walk away auto lock armed", "trunk open", "tailgate opening", "tailgate obstruction", "keyless remote left behind", "keyless remote missing", "tire pressure low", "tire pressure high", "you are low on gas", "fuel door/hatch open", "gas cap missing", "taillight malfunction", "door ajar", "sunroof open while vehicle locked", and other vehicle status updates or vehicle operational notifications, etc., and in particular to report features or conditions of the vehicle that are relatively more nuanced than discrete "locked" and "unlocked" events, and therefore its meaning could not be conveyed and understood easily via nonspeech sounds such as beeping.

FIG. 7 is a flow chart illustrating an embodiment of a method 700 of managing vehicle notifications. The method 700 includes a first step 710 of receiving, at an electronic control unit (ECU), an indication of a first triggering event having occurred. In addition, the method 700 includes a second step 720 of automatically generating, at the ECU, a first control signal in response to the first triggering event. A third step 730 includes automatically determining, by a spoken language feedback system, the first control signal is linked to a first record, the first record including a first speech-based audio file conveying first information about a vehicle-related condition, status, or operation that is associated with the first triggering event. A fourth step 740 includes automatically presenting, via a first speaker of an acoustic vehicle alerting system (AVAS), the first speech-based audio file.

In other embodiments, the method may include additional steps or aspects. As one example, the method can also include retrieving the first record from a spoken word feedback repository that includes a plurality of records, each record including at least one speech-based audio file conveying information about a condition of the vehicle, and each record being linked to a different control signal. In some embodiments where the first record includes a plurality of speech-based audio files including the first speech-based audio file that each convey a similar message in a different language, the method can also include steps of receiving at a first time, at the ECU, a selection from a first user of a first language; and selecting the first speech-based audio file from the plurality of speech-based audio files based on the first speech-based audio file including speech in the first language. In different embodiments, the method can also include steps of: receiving at a second time after the first time, at the ECU, a selection from a second user of a second language that differs from the first language; receiving, at the ECU, an indication of the first triggering event having occurred again; and selecting, for presentation via the first speaker, a second speech-based audio file from the plurality of speech-based audio files based on the second speech-based audio file including speech in the second language.

In some examples, the method can also include: receiving, at the ECU, an indication of a second triggering event having occurred that differs from the first triggering event; automatically generating, at the ECU, a second control signal in response to the second triggering event; determining the second control signal is linked to a second record, the second record including a second speech-based audio file conveying second information that differs from the first information; and presenting, via the first speaker, the second speech-based audio file. In one embodiment, the first speaker is installed along an exterior (i.e., outside of the interior cabin) of the vehicle. In another example, the first control signal can also be linked to a first non-speech audio file that is presented concurrently with, immediately before, or immediately after, the first speech-based audio file by a second speaker disposed within an interior cabin of the vehicle In different embodiments, the disclosure further provides a spoken language feedback system. The system can include an acoustic vehicle alerting system (AVAS) that communicatively coupled to at least one vehicle electronic control unit (ECU). In addition, the system includes a spoken word feedback repository that is communicatively coupled to the AVAS. In some embodiments, the AVAS can be configured to: (1) access a language selection stored in a spoken word feedback repository of the spoken language feedback system; (2) generate a first control signal corresponding to a first triggering event; (3) access a first record that is linked to a first record, the first record including a first speech-based audio file conveying first information about a vehicle-related condition, status, or operation that is associated with the first triggering event; and (4) present, via a first speaker of the AVAS, the first speech-based audio file.

As another example, the proposed embodiments can include a vehicle incorporating a vehicle notification system. The vehicle notification system can include an acoustic vehicle alerting system (AVAS) that includes at least a first speaker installed outside of an interior cabin of the vehicle; a spoken-word feedback repository including a plurality of records including a first record, each record including a speech-based audio message conveying information about a condition, status, or operation of the vehicle; a communication bus; and an electronic control unit (ECU) that causes, in response to a first control signal, a first record linked to the first control signal to be communicated over the vehicle communication bus to the AVAS for playback by the first speaker. In some embodiments, the first control signal is also linked to a first non-speech audio file that is presented concurrently with, immediately before, or immediately after the first speech-based audio file by a second speaker disposed within the interior cabin. In another example, the first speech-based audio file is played back in response to a triggering event in which the ECU detects, via onboard sensors, a predefined change in the condition of the vehicle. In some embodiments, the first record includes a set of sub-records, and each sub-record conveys similar information in a different language. In some embodiments, the record(s) for the acoustic signal samples are stored in memory.

Thus, as described herein, a vehicle notification system is configured to cause the AVAS speaker of a vehicle to output recordings of voice (speech-based) alerts outside of the vehicle. In addition, this augmentation of the AVAS can be configured to make selections based on a language selection received from the user or alternatively, a previously entered language selection from the vehicle head unit. In one example, the AVAS system would store or have access to a storage module in which audible comments are available in multiple languages. In some embodiments, the vehicle notification system would observe or request data via the communication bus, and when a triggering event occurs, generate a command for to cause an alert to be presented. The command would cause playback of a specific audio file, rather than (or in addition to) the conventional beeping sound. In some embodiments, the system can choose what specific audio file to play back in response to the user language selection. In one embodiment, vehicles currently employing an AVAS would require only that the corresponding keyless buzzer commands be translated to the new spoken audio, as each keyless buzzer command already has a specific command on the communication bus. With the proposed system, rather than continuing to foster user confusion by traditional beeping sounds, various audible feedback, recorded in multiple languages, can be presented. Furthermore, the vehicle notification system is configured to permit a dual functionality of the AVAS, thereby enabling playback of any safety recordings at low speeds as well as enabling playback of the disclosed verbal alerts when the vehicle is stopped.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to the communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method of managing vehicle notifications, the method comprising:

receiving, at an electronic control unit (ECU) for a vehicle, an indication of a first triggering event having occurred, the first triggering event including a detection of a change in condition, status, or operation of the vehicle;

identifying, at the ECU and with reference to a first record stored in an onboard spoken language feedback relational database, a first bus command that is associated with the first triggering event, the first record including a first speech-based audio file conveying first information about the detected change; and transmitting, from the ECU and to an acoustic vehicle alerting system (AVAS) of the vehicle, a first control signal that includes the first bus command and the first speech-based audio file, thereby causing the AVAS to present, via a first speaker, the first speech-based audio file.

2. The method of claim 1, wherein the spoken language feedback relational database includes a plurality of records, each record including at least one speech-based audio file conveying information about a condition of the vehicle, and each record being linked to a different bus command.

3. The method of claim 1, wherein the first record includes a plurality of speech-based audio files including the first speech-based audio file that each convey a similar message in a different language, and the method further comprises:

receiving at a first time, at the ECU, a selection from a first user of a first language; and selecting the first speech-based audio file from the plurality of speech-based audio files based on the first speech-based audio file including speech in the first language.

4. The method of claim 3, further comprising:

receiving at a second time after the first time, at the ECU, a selection from a second user of a second language that differs from the first language;

receiving, at the ECU, an indication of the first triggering event having occurred again; and selecting, for presentation via the first speaker, a second speech-based audio file from the plurality of speech-based audio files based on the second speech-based audio file including speech in the second language.

5. The method of claim 1, further comprising:

receiving, at the ECU, an indication of a second triggering event having occurred that differs from the first triggering event;

identifying, at the ECU and with reference to a second record stored in the spoken language feedback relational database, a second bus command that is associated with the second triggering event, the second record including a second speech-based audio file conveying information that differs from the first information; and transmitting, from the ECU and to the AVAS, a second control signal that includes the second bus command and the second speech-based audio file, thereby causing the AVAS to present, via the first speaker, the second speech-based audio file.

6. The method of claim 1, wherein the first speaker is installed along an exterior of the vehicle.

7. The method of claim 1, wherein the first bus command is also linked to a first non-speech audio file that is presented concurrently with the first speech-based audio file by a second speaker disposed within an interior cabin of the vehicle.

8. A spoken language feedback system, the system including:

an acoustic vehicle alerting system (AVAS) communicatively coupled to at least one vehicle electronic control unit (ECU), the ECU configured to:

receive an indication of a first triggering event having occurred, the first triggering event including a detection of a change in condition, status, or operation of the vehicle;

identify, with reference to a first record stored in an onboard spoken language feedback relational database, a first bus command that is associated with the first triggering event, the first record including a first speech-based audio file conveying first information about the detected change; and transmit, to the AVAS, a first control signal that includes the first bus command and the first speech-based audio file, thereby causing the AVAS to present, via a first speaker, the first speech-based audio file.

9. The system of claim 8, wherein the spoken language feedback relational database includes a plurality of records stored in the spoken word feedback repository, each record including at least one speech-based audio file conveying information about a condition of the vehicle, and each record being linked to a different bus command.

10. The system of claim 8, wherein the first record includes a plurality of speech-based audio files including the first speech-based audio file that each convey a similar message in a different language, and the ECU is further configured to:

receive at a first time a selection from a first user of a first language; and select the first speech-based audio file from the plurality of speech-based audio files based on the first speech-based audio file including speech in the first language.

11. The system of claim 10, wherein the ECU is further configured to:

receive at a second time after the first time a selection from a second user of a second language that differs from the first language;

receive an indication of the first triggering event having occurred again; and select, for presentation via the first speaker, a second speech-based audio file from the plurality of speech-based audio files based on the second speech-based audio file including speech in the second language.

12. The system of claim 8, wherein the ECU is further configured to:

receive an indication of a second triggering event having occurred that differs from the first triggering event;

identify and with reference to a second record stored in the spoken language feedback relational database a second bus command that is associated with the second triggering event, the second record including a second speech-based audio file conveying second information that differs from the first information; and transmit, from the ECU and to the AVAS, a second control signal that includes the second bus command and the second speech-based audio file, thereby causing the AVAS to present, via the first speaker, the second speech-based audio file.

13. The system of claim 8, wherein the first speaker is installed along an exterior of the vehicle.

14. The system of claim 8, wherein the first bus command is also linked to a first non-speech audio file that is presented concurrently with the first speech-based audio file by a second speaker disposed within an interior cabin of the vehicle.

15. A system for managing vehicle notifications, the system comprising one or more computers and one or more storage devices storing instructions that are operable, when executed by the one or more computers, to cause the one or more computers to:

receive, at an electronic control unit (ECU) for a vehicle, an indication of a first triggering event having occurred, the first triggering event including a detection of a change in condition, status, or operation of the vehicle;

identify, at the ECU and with reference to a first record stored in an onboard spoken language feedback relational database, a first bus command that is associated with to the first triggering event, the first record including a first speech-based audio file conveying first information about the detected change; and transmit, from the ECU and to an acoustic vehicle alerting system (AVAS) of the vehicle, a first control signal that includes the first bus command and the first speech-based audio file, thereby causing the AVAS to present, via a first speaker, the first speech-based audio file.

16. The system of claim 15, wherein the spoken language feedback relational database includes a plurality of records, each record including at least one speech-based audio file conveying information about a condition of the vehicle, and each record being linked to a different bus command.

17. The system of claim 15, wherein the first record includes a plurality of speech-based audio files including the first speech-based audio file that each convey a similar message in a different language, and the instructions further cause the one or more computers to:

receive at a first time, at the ECU, a selection from a first user of a first language; and select the first speech-based audio file from the plurality of speech-based audio files based on the first speech-based audio file including speech in the first language.

18. The system of claim 17, wherein the instructions further cause the one or more computers to:

receive at a second time after the first time, at the ECU, a selection from a second user of a second language that differs from the first language;

receive, at the ECU, an indication of the first triggering event having occurred again; and select, for presentation via the first speaker, a second speech-based audio file from the plurality of speech-based audio files based on the second speech-based audio file including speech in the second language.

19. The system of claim 15, wherein the instructions further cause the one or more computers to:

receive, at the ECU, an indication of a second triggering event having occurred that differs from the first triggering event;

identify, at the ECU and with reference to a second record stored in the spoken language feedback relational database, a second bus command that is associated with the second triggering event, the second record including a second speech-based audio file conveying information that differs from the first information; and transmit, from the ECU and to the AVAS, a second control signal that includes the second bus command and the second speech-based audio file, thereby causing the AVAS to present, via the first speaker, the second speech-based audio file.

20. The system of claim 15, wherein the first bus command is also linked to a first non-speech audio file that is presented concurrently with the first speech-based audio file by a second speaker disposed within an interior cabin of the vehicle.

* * * * *